Oct. 11, 1955  F. M. POTTER  2,720,575
METHOD OF BRAZING A JOINT
Filed March 27, 1952

INVENTOR.
FREDERICK M. POTTER
BY
*James M. Nickels*
ATTORNEY

United States Patent Office 2,720,575
Patented Oct. 11, 1955

2,720,575

METHOD OF BRAZING A JOINT

Frederick M. Potter, Washington Township, Bergen County, N. J., assignor to Bendix Aviation Corporation, Teterboro, N. J., a corporation of Delaware Application March 27, 1952, Serial No. 278,807

6 Claims. (Cl. 219—10)

The present invention relates to forming brazed joints between two metal pieces and more particularly to brazing the ends of two rectangular wires together so that an excellent electrical and mechanical joint is obtained which requires no more space than a single wire.

In certain applications, for example, in preformed windings for electrical apparatus, it is desirable to join the ends of two wires together to form a continuous path for electrical current. Under present practice, in order to make a good connection electrically the mechanical configuration will be somewhat larger than the conductors. However, space requirements are such that will require the joint to be no larger than the conductors.

The present invention provides a method for making a connection between the ends of two rectangular wires having good electrical conductivity yet requiring no more space than a single wire.

To produce a uniformly brazed joint, it is necessary that the two pieces to be brazed be heated uniformly under controlled pressure. Resistance welding or brazing, in which a high electrical current is passed through the joint, is used extensively for brazing electrical connections. One difficulty, however, is maintaining uniform pressure throughout the joint.

It is an object of the invention to overcome the aforenoted difficulty.

Another object of the invention is to provide an improved method of joining two conductors together.

Another object of the invention is to provide an improved electrical joint.

The above and other objects and features of the invention will appear more fully hereinafter from a consideration of the following description taken in connection with the accompanying drawing wherein two embodiments of the invention are illustrated by way of example.

Figure 1:
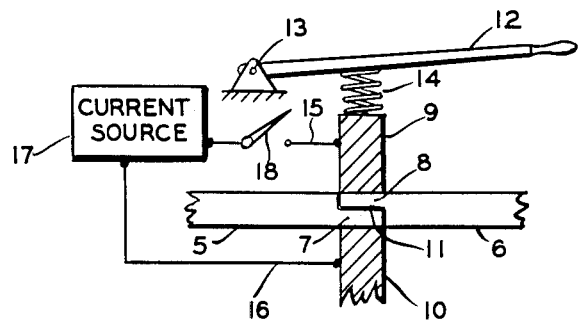
Figure 1 is a diagrammatical representation of one form of joint.

Referring to Figure 1 of the drawing, conductors 5 and 6 are formed with lapped ends 7 and 8. The conductors 5 and 6 are positioned between electrodes 9 and 10 with a strip of self-fluxing silver solder 11 placed between the two lapped ends 7 and 8. Pressure is applied to the electrodes by a lever 12 pivoted at 13 and compressing a spring 14. It is understood, however, that other means for applying pressure to the electrodes may be used. The electrodes are connected by conductors 15 and 16 to a suitable source of current 17. A switch 18 may be inserted in the conductor 15.

The disadvantage of the joint formed as illustrated in Figure 1 is that no pressure is exerted on the vertical sections of the joint and hence would not produce a uniformly brazed joint.

Figure 2:
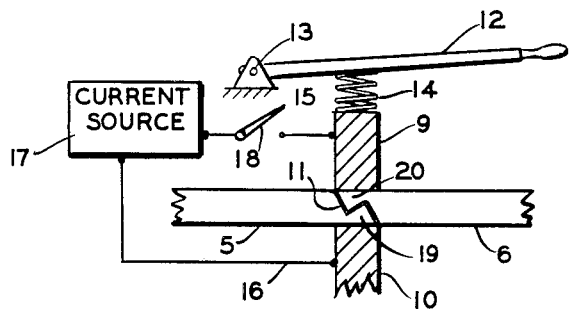
Figure 2 is a diagrammatic showing of a joint illustrating one embodiment of the invention.

Referring now to Figure 2, wherein like parts have been assigned the same reference numerals as in Figure 1, the conductors 5 and 6 are formed with matching saw-toothed sections 19 and 20. A strip of self-fluxing silver solder 11 is placed between the surfaces of the saw-toothed sections 19 and 20. Pressure is applied to the electrodes by the lever 12 and current passed through the joint. It can be seen that, in this configuration, pressure is exerted on the entire surfaces of the joint. However, it is difficult to form the sharp corners on the conductor, also, it requires sharp bends in the solder strip 11.

Figure 3:
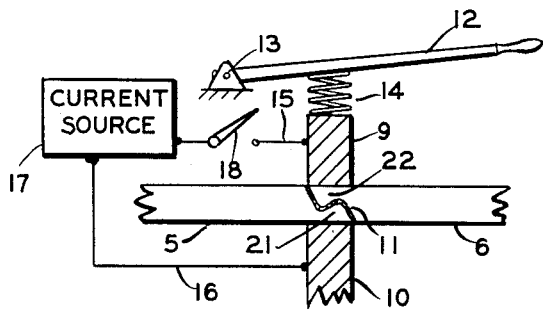
Figure 3 is a diagrammatic showing of another embodiment of the invention.

In Figure 3, wherein like parts have been assigned the same reference numerals as in the previous figures, the ends of the conductors 5 and 6 are formed having matching S-shaped sections 21 and 22. A strip of silver solder 11 is placed between the surfaces of the S-shaped sections 21 and 22 and the S-shaped sections positioned between the electrodes 9 and 10. Pressure is applied to the electrodes 9 and 10 by the lever 12 or in any other conventional manner and a high current passed through the joint from the source 17. The current melts the solder and fuses the two conductors together. The S-shaped configuration enables pressure to be applied uniformly throughout the entire surfaces of the joint. Not only is the joint brazed uniformly but it has a large area which is required for a minimum resistance connection yet requires no more space than a single wire.

Although only two embodiments of the invention have been illustrated and described, various changes in the form and relative arrangement of the parts, which will now appear to those skilled in the art, may be made without departing from the scope of the invention.

What is claimed is:

1. The method of welding the ends of two rectangular wires together which comprises forming the ends for overlapping relationship and shaped so pressure applied thereon will be substantially uniform throughout the surface of the joint, placing a strip of self-fluxing solder between the overlapping sections, applying pressure on the overlapping sections, and passing a high electrical current through the joint.

2. The method of welding the ends of two wires together which comprises forming the ends of the wires in saw-tooth configuration, forming a strip of self-fluxing solder over one of said saw-toothed sections, interlocking the two saw-toothed sections, applying pressure distributed uniformly over the interlocking sections to urge said sections together, and passing a high electrical current through the interlocking sections.

3. The method of welding the ends of two rectangular conductors together to form a continuous conductor which comprises shaping the ends of the conductors to form a horizontal S-shaped configuration, interlocking the S-shaped sections with a strip of solder placed therebetween, and passing a high electrical current through the surfaces of the S-shaped section while maintaining pressure uniformly distributed over the interlocking sections to urge the sections together.

4. The method of welding the ends of two rectangular conductors together to form an electrical connection which comprises forming interlocking contours adjacent the ends of the conductors, placing a strip of solder between the interlocking contours, applying a substantially uniform pressure along the entire surface of the contours and passing a high electric current therethrough to melt said solder and fuse said wires together.

5. The method of welding the ends of two electrical conductors together which comprises forming the ends of the conductors so that the irregular face of one end will complement that of the other, placing a strip of self fluxing solder over one of the formed ends, bringing the two formed ends together in complementary relationship having the strip of solder between them, and passing a high electrical current through the conductors while at the same time applying a uniformly distributed pressure to the conductors in a direction drawing the opposed complementary faces of the conductors uniformly toward one another.

6. The method of welding two electrical conductors together which comprises forming an irregular surface in one of the conductors so that the face thereof complements the face of an irregular surface in the other, placing a strip of self fluxing solder over one of the complementary faces, bringing the two faces together in complementary relationship with the strip of solder between them, and applying a high electric current through the conductors while at the same time applying a uniformly distributed pressure to the conductors in a direction drawing the opposed faces of the conductors uniformly toward one another.

References Cited in the file of this patent

UNITED STATES PATENTS

| Number | Name | Date |
|---|---|---|
| 578,801 | Wilmot | Mar. 16, 1897 |
| 1,260,690 | Liady | Mar. 26, 1918 |
| 1,303,007 | Alzmann | May 6, 1919 |
| 1,372,634 | Thornton | Mar. 22, 1921 |
| 1,490,647 | Thomson | Apr. 15, 1924 |
| 1,773,068 | Vienneau | Aug. 12, 1930 |
| 2,535,397 | Duch et al. | Dec. 26, 1950 |